United States Patent
McClintock et al.

(10) Patent No.: US 10,095,860 B1
(45) Date of Patent: Oct. 9, 2018

(54) VALIDATING SIGN-OUT IMPLEMENTATION FOR IDENTITY FEDERATION

(71) Applicant: Amazon Technologies, Inc., Seattle, WA (US)

(72) Inventors: Jon Arron McClintock, Seattle, WA (US); David Scott Cleckley, Jr., Seattle, WA (US); Robert Ellis Lee, Seattle, WA (US); Annabelle Richard Backman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 259 days.

(21) Appl. No.: 14/963,819

(22) Filed: Dec. 9, 2015

(51) Int. Cl.
*G06F 21/45* (2013.01)
*H04L 29/06* (2006.01)

(52) U.S. Cl.
CPC .......... *G06F 21/45* (2013.01); *H04L 63/0815* (2013.01)

(58) Field of Classification Search
CPC .......... G06F 21/45; G06F 21/41; G06F 21/50; G06F 21/335; H04L 63/0815; H04L 63/0807; H04L 63/08; H04L 63/102; H04L 69/18
See application file for complete search history.

(56) References Cited

U.S. PATENT DOCUMENTS

| | | | | |
|---|---|---|---|---|
| 7,673,045 | B1* | 3/2010 | Battle | G06F 21/41 709/219 |
| 8,863,250 | B2* | 10/2014 | Hitchcock | H04L 63/08 713/182 |
| 8,898,765 | B2* | 11/2014 | Goyal | G06F 21/41 726/8 |
| 9,106,642 | B1* | 8/2015 | Bhimanaik | G06F 21/335 |
| 9,268,931 | B2* | 2/2016 | Subramaniam | H04L 63/0815 |
| 2003/0149781 | A1* | 8/2003 | Yared | G06F 21/41 709/229 |
| 2004/0128393 | A1* | 7/2004 | Blakley, III | H04L 63/0807 709/229 |
| 2006/0218628 | A1* | 9/2006 | Hinton | H04L 63/0815 726/8 |
| 2007/0039043 | A1* | 2/2007 | Garskof | G06F 21/41 726/8 |
| 2008/0271121 | A1* | 10/2008 | Hinton | H04L 63/0815 726/4 |
| 2010/0071056 | A1* | 3/2010 | Cheng | H04L 63/0815 726/16 |
| 2012/0278872 | A1* | 11/2012 | Woelfel | H04L 61/2596 726/7 |

(Continued)

*Primary Examiner* — Benjamin E Lanier
*Assistant Examiner* — Shu Chun Gao
(74) *Attorney, Agent, or Firm* — Thomas | Horstemeyer, LLP

(57) ABSTRACT

Disclosed are various embodiments for validating that relying parties of a federated identity provider have correctly implemented sign-out functionality. In one approach, a network page is received from a network site that is operated by a relying party of a federated identity provider. It is then determined whether the network page includes code that properly implements a sign-out from the federated identity provider. An action is initiated in response to determining that the network page does not include code that properly implements the sign-out from the federated identity provider.

20 Claims, 6 Drawing Sheets

(56) References Cited

U.S. PATENT DOCUMENTS

| | | | |
|---|---|---|---|
| 2013/0160117 A1* | 6/2013 | Ionescu | H04L 63/1425 726/22 |
| 2013/0246630 A1* | 9/2013 | Exton | H04L 67/02 709/227 |
| 2015/0188906 A1* | 7/2015 | Minov | H04L 63/0815 726/8 |

* cited by examiner

US 10,095,860 B1

VALIDATING SIGN-OUT IMPLEMENTATION FOR IDENTITY FEDERATION

BACKGROUND

Identity federation refers to linking the identity of a person across multiple distinct identity management systems. With identity federation, a person can employ a single set of identity credentials (e.g., username and password) to sign on to multiple network sites operated by different organizations. Each of these network sites integrates its respective authentication system with systems of a federated identity provider. Consequently, once a user is authenticated with the federated identity provider, the user also can become authenticated for each network site that relies upon the federated identity provider.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
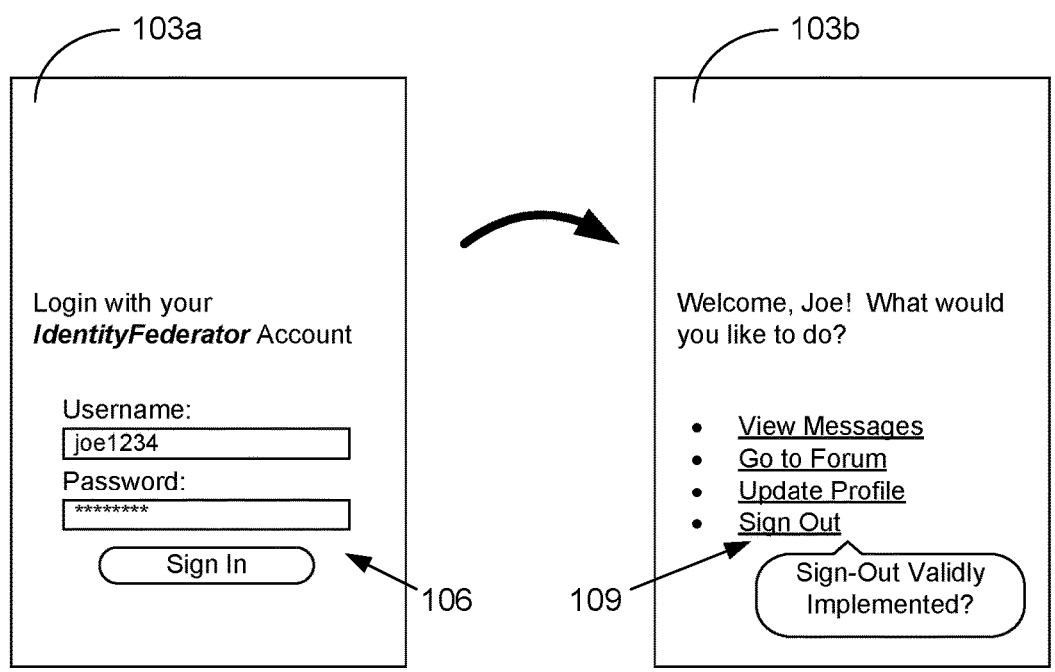
FIG. 1 is a drawing of an example scenario involving a sign-in via a federated identity provider according to various embodiments of the present disclosure.

The present disclosure relates to determining whether sign-out functionality is correctly implemented for relying parties of federated identity providers. Once a user at a client device is authenticated with a federated identity provider, a session can be created. A session token is provided to the client device, and the session token enables one or more applications on the client device to access computing resources associated with the user's federated identity. The session token may expire after a fixed duration (e.g., after 30 minutes) or in response to a certain event (e.g., the user performs an action that casts doubt on the user's identity, thereby prompting an invalidation of the session token). In some scenarios, especially with mobile devices that are typically used by a single user, a session token may have an indefinite lifetime.

In some cases, a user may wish to explicitly end a session by logging out or signing out. For example, the user may be using a public computer such as a kiosk, and the user may want to deny access to session resources for any subsequent walk-up users. Generally, a user may use a device that may later be used by an untrusted third party, and the user may wish to deny access to session resources to the untrusted third party. In such situations, the user may click on a sign-out button or link in a user interface of an application or a network site in order to end the session.

However, in regard to federated identity systems, sign-out functionality is often not implemented correctly by relying parties. Although a user may click a link labeled "log out" on a network page of a relying party, the session of the user with respect to the federated identity provider may not be terminated. In some situations, the session of the user may be ended with respect to the systems of the relying party, but the session of the user with respect to the federated identity provider may persist, contrary to the intent of the user. Consequently, in the case of a kiosk, a subsequent walk-up user may be able to access secured resources of the previous user through systems of other relying parties of the federated identity provider.

Various embodiments of the present disclosure introduce approaches for determining whether relying parties of a federated identity provider have implemented sign-out functionality correctly. Under one set of approaches, network pages and/or other user interfaces of a relying party may be crawled to determine whether sign-out code is present. If the sign-out code is present, it can be validated to determine whether it is functioning correctly. Under another set of approaches, sign-out frequency can be empirically determined for each relying party. If users who signed in via a referral from a particular relying party consistently fail to sign out, it may be determined that sign-out functionality for that relying party is either absent or not implemented correctly. Reports may be generated for administrators of the federated identity provider. In some cases, automated remedial actions may be taken with respect to relying parties who are not complying with sign-out implementation guidelines.

Turning now to FIG. 1, shown is a drawing of an example scenario 100 involving a sign-in via a federated identity provider. In the user interface 103a, a network site provides an opportunity for a user to sign-in using identity federation through a federated identity provider known as "IdentityFederator." A form 106 in the user interface 103a solicits a username and password for an account with the federated identity provider. Once the user selects a sign-in button, the federated identity provider validates the username and password and returns an authentication token to the user's client and/or the network site that confirms the user's identity. This begins a session of the user with the federated identity provider. During the session, the user may be able to access resources associated with other network sites that support identity federation with the federated identity provider without having to sign-in again.

Subsequently, the user interface 103b is rendered. In the user interface 103b, the network site may provide access to various resources and/or functions that require or pertain to a user account. The content of the user interface 103b may be customized for the particular authenticated user (e.g., "Welcome, Joe!"). In this example, the user interface 103b includes hyperlinks to perform functions as the authenticated user (e.g., "View Messages," "Go to Forum," and "Update Profile"). Further, the user interface 103b includes a sign-out component 109 that, when selected, enables the user to initiate a sign-out of his or her session.

Sometimes the sign-out component 109 is absent or is otherwise improperly implemented such that selection of the sign-out component 109 does not result in a sign-out from the federated identity provider. As will be described, the present disclosure provides various approaches for determining whether a given network site has validly implemented sign-out functionality, where the network site relies upon the federated identity provider for authentication of users. In the following discussion, a general description of the system and its components is provided, followed by a discussion of the operation of the same.

Figure 2:
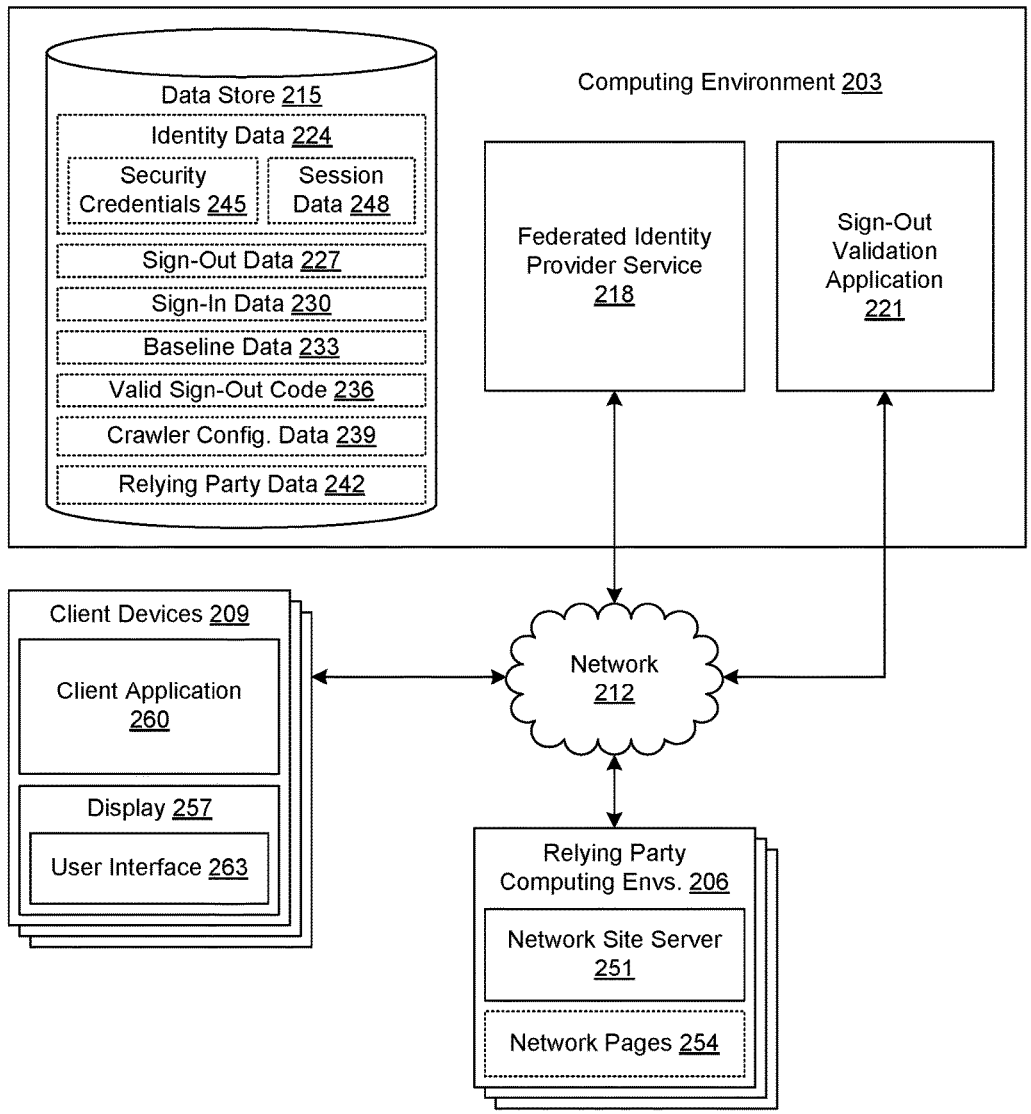
FIG. 2 is a schematic block diagram of a networked environment according to various embodiments of the present disclosure.

With reference to FIG. 2, shown is a networked environment 200 according to various embodiments. The networked environment 200 includes a computing environment 203 operated by a federated identity provider, a plurality of relying party computing environments 206 operated by relying parties of the federated identity provider, and a plurality of client devices 209, which are in data communication with each other via a network 212. The network 212 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 and the relying party computing environments 206 may each comprise, for example, a server computer or any other system providing computing capability. Alternatively, the computing environment 203 and the relying party computing environments 206 may each employ a plurality of computing devices that may be arranged, for example, in one or more server banks, computer banks, or other arrangements. Such computing devices may be located in a single installation or may be distributed among many different geographical locations. For example, the computing environment 203 and the relying party computing environments 206 may each include a plurality of computing devices that together may comprise a hosted computing resource, a grid computing resource, and/or any other distributed computing arrangement. In some cases, the computing environment 203 and the relying party computing environments 206 may each correspond to an elastic computing resource where the allotted capacity of processing, network, storage, or other computing-related resources may vary over time.

Various applications and/or other functionality may be executed in the computing environment 203 according to various embodiments. Also, various data is stored in a data store 215 that is accessible to the computing environment 203. The data store 215 may be representative of a plurality of data stores 215 as can be appreciated. The data stored in the data store 215, for example, is associated with the operation of the various applications and/or functional entities described below.

The components executed on the computing environment 203, for example, include a federated identity provider service 218, a sign-out validation application 221, and other applications, services, processes, systems, engines, or functionality not discussed in detail herein. The federated identity provider service 218 is executed to receive security credentials from client devices 209 as part of a sign-in process, validate the security credentials, and assuming valid credentials, issue authentication tokens to the client devices 209 and/or the relying party computing environments 206. In various embodiments, the federated identity provider service 218 may support OpenID, security assertion markup language (SAML), OAuth, and/or other authentication technologies.

The sign-out validation application 221 is executed to validate that the relying parties of the federated identity provider have properly implemented sign-out functionality on their respective network sites and/or in their respective client applications. Under one approach, the sign-out validation application 221 can crawl a network site of a relying party to determine whether code that properly implements sign-out functionality is included. In crawling a network site, the sign-out validation application 221 may begin by requesting an initial network resource (e.g., a web page) at an initial uniform resource locator (URL). The sign-out validation application 221 processes the received network resource to determine other URLs within the same network site. The sign-out validation application 221 can then request network resources at the other URLs and perform the same processing as with respect to the initial network resource. This process may repeat indefinitely, or up to a desired depth within the network site. The processing of each network resource may involve scanning the respective network resource to determine whether code that properly implements sign-out functionality is included. In one scenario, the sign-out validation application 221 may test detected sign-out functionality to validate that it is working.

Under another approach, the sign-out validation application 221 can determine whether a volume of observed sign-outs associated with the relying party is abnormally low compared to the volume of observed sign-ins associated with the relying party. A threshold for the volume to be considered abnormally low may be manually configured by a system administrator. Alternatively, the threshold may be learned over time with reference to observed volumes. If the volume of observed sign-outs is abnormally low, sign-out functionality may not be properly implemented by the relying party. In some cases, the sign-out validation application 221 can employ a combination of both approaches.

The data stored in the data store 215 includes, for example, identity data 224, sign-out data 227, sign-in data 230, baseline data 233, valid sign-out code 236, crawler configuration data 239, relying party data 242, and potentially other data. The identity data 224 contains data used by the federated identity provider service 218 to authenticate users. To this end, the identity data 224 may include security credentials 245 and session data 248. The security credentials 245 may include various types of credentials that may be used to confirm a user's identity. Examples of security credentials 245 may include usernames, passwords, biometric identifiers, secure certificates, private keys, answers to knowledge-based questions, device identifiers, and so on. The session data 248 may record state information associated with a current session of a user, such as start time, duration, expiration time, network address of a client device 209, and other data. Also, the session data 248 may include valid session tokens and/or information to recognize valid session tokens.

The sign-out data 227 records explicit session sign-outs via the federated identity provider service 218, and the sign-in data 230 records session sign-ins via the federated identity provider service 218. The records in both the sign-out data 227 and the sign-in data 230 may be referenced to a specific relying party who referred the sign-out or sign-in. The baseline data 233 provides baseline thresholds regarding a baseline of sign-in frequency versus sign-out frequency for relying parties. The baseline data 233 may be generated by the sign-out validation application 221 from an analysis of the sign-out data 227 and the sign-in data 230 on a per-relying-party basis.

The valid sign-out code 236 may correspond to code, or profiles of code, that enable sign-out functionality for the federated identity provider service 218. The valid sign-out code 236 may correspond to approved, predefined code that is intended to be incorporated in a network page or client application of a relying party in order to facilitate user sign-outs. The valid sign-out code 236 may include hypertext markup language (HTML), extensible markup language (XML), JAVASCRIPT, and/or other client-renderable code. In some cases, the valid sign-out code 236 may correspond to a uniform resource locator (URL) included within a network page that, when accessed, causes additional sign-out code to be loaded. In one example, a URL may be loaded within an "iframe" of a network page.

The crawler configuration data 239 configures crawler functionality of the sign-out validation application 221 that enables the sign-out validation application 221 to examine network sites of a relying party for compliance with sign-out functionality guidelines. To this end, the crawler configuration data 239 may include parameters that enable the sign-out validation application 221 to sign-in as an authenticated user with a relying party in order to examine the user interfaces that a normal authenticated user would see. The crawler configuration data 239 may also define which network pages may be crawled and which network pages would be expected to include sign-out capability. In one example, the crawler configuration data 239 specifies a maximum depth of traversal for hyperlinks of a network site. In one embodiment, the crawler configuration data 239 can include configuration parameters for examining a client application such as a mobile application to confirm that sign-out functionality is included.

The relying party data 242 defines a plurality of relying parties of the federated identity provider service 218. The relying parties may be associated with referring URLs and/or other identifiers that enable the federated identity provider service 218 to determine an originating relying party for a sign-in or sign-out request.

The components executed on each relying party computing environment 203, for example, include a network site server 251 and other applications, services, processes, systems, engines, or functionality not discussed in detail herein. The network site server 251 is executed to generate or serve up one or more network pages 254, such as web pages, gopher pages, or other electronic user interfaces. In some embodiments, the network site server 251 may serve up user interface data to client applications via an application programming interface (API). The network site server 251 may include a hypertext transfer protocol (HTTP) server such as APACHE HTTP Server, APACHE TOMCAT, MICROSOFT Internet Information Services (IIS), or other servers.

The client devices 209 may each comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head-mounted display devices, voice interactive devices, or other devices. The client devices 209 may include a display 257. The display 257 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client devices 209 may be configured to execute various applications such as a client application 260 and/or other applications. The client application 260 may be executed in a client device 209, for example, to access network content served up by a relying party computing environment 206 and/or other servers, thereby rendering a user interface 263 on the display 257. To this end, the client application 260 may comprise, for example, a browser, a dedicated application, etc., and the user interface 263 may comprise a network page, an application screen, etc. The client devices 209 may be configured to execute applications beyond the client application 260 such as, for example, email applications, social networking applications, word processors, spreadsheets, and/or other applications.

Figure 3:
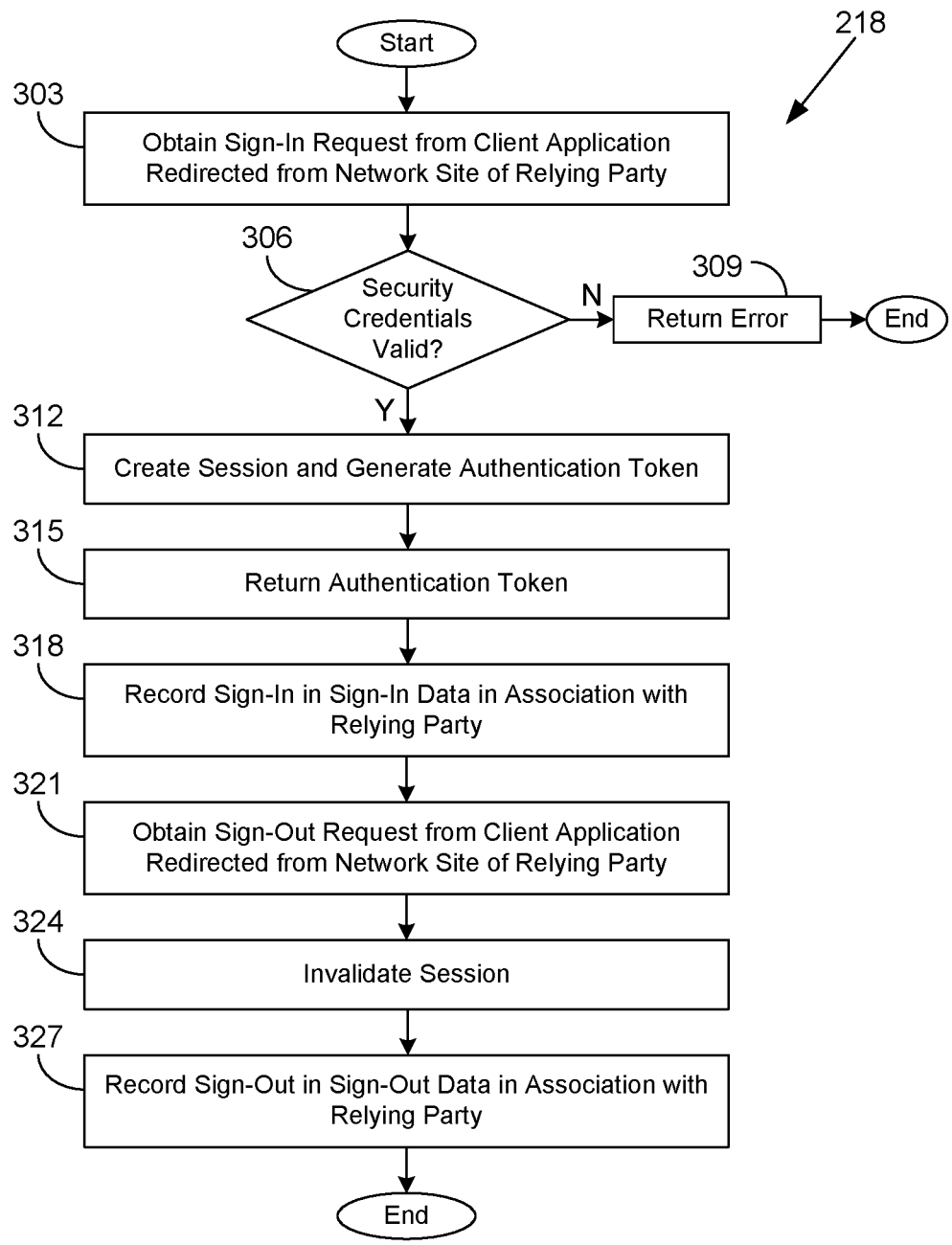
FIG. 3 is a flowchart illustrating one example of functionality implemented as portions of a federated identity provider service executed in a computing environment in the networked environment of FIG. 2 according to various embodiments of the present disclosure.

Referring next to FIG. 3, shown is a flowchart that provides one example of the operation of a portion of the federated identity provider service 218 according to various embodiments. It is understood that the flowchart of FIG. 3 provides merely an example of the many different types of functional arrangements that may be employed to implement the operation of the portion of the federated identity provider service 218 as described herein. As an alternative, the flowchart of FIG. 3 may be viewed as depicting an example of elements of a method implemented in the computing environment 203 (FIG. 2) according to one or more embodiments.

Beginning with box 303, the federated identity provider service 218 obtains a sign-in request from a client application 260 (FIG. 2) executed on a client device 209 (FIG. 2) that has been redirected from a network site server 251 (FIG. 2) of a relying party, where the relying party relies upon the federated identity provider service 218 for verifying user identities. The sign-in request specifies one or more credentials, such as usernames, passwords, biometric identifiers, or other credentials. In box 306, the federated identity provider service 218 determines whether the credentials specified in the sign-in request are valid according to the stored security credentials 245 (FIG. 2) in the identity data 224 (FIG. 2). If the credentials are not valid, the federated identity provider service 218 may return an error in box 309. Thereafter, the operation of the portion of the federated identity provider service 218 ends.

Otherwise, if the credentials are valid, the federated identity provider service 218 continues from box 306 to box 312. In box 312, the federated identity provider service 218 creates a session for the authenticated user, which may include generating one or more authentication tokens or session tokens. These tokens can be used to confirm authentication status of the client device 209.

In box 315, the federated identity provider service 218 returns the generated authentication token to the client device 209 and/or the network site server 251 that redirected the sign-in request. For example, an HTTP cookie containing the authentication token may be set on the client application 260. In some cases, the network site server 251 may follow by generating a session token, where the client application 260 exchanges the authentication token generated by the federated identity provider service 218 for the network site-specific session token. The client application 260 is then able to access resources of the network site server 251 by presenting the session token and/or authentication token. Further, the client application 260 may be able to access resources of other network site servers 251 operated by other relying parties using the authentication token without requiring a separate sign-in, thereby facilitating a single sign-on (SSO) experience.

In box 318, the federated identity provider service 218 records the sign-in in the sign-in data 230 (FIG. 2) in association with an identification of the relying party from whom the sign-in was redirected. In box 321, the federated identity provider service 218 obtains a sign-out request from the client application 260, which has been redirected from the network site server 251 of the relying party. The sign-out request may specify the authentication token or another identifier of the session. It is noted that a corresponding sign-out request is not required for each sign-in request. In fact, some users may choose not to sign-out, thereby allowing their session to persist indefinitely or until a predefined expiration time or expiration event. Also, some relying parties may not implement sign-out functionality properly.

In box 324, the federated identity provider service 218 invalidates the session, which can include invalidating the authentication token so that it may no longer be used to access resources of relying parties. In box 327, the federated identity provider service 218 records the sign-out in the sign-out data 227 (FIG. 2) in association with an identification of the relying party from whom the sign-out was redirected. Thereafter, the operation of the portion of the federated identity provider service 218 ends.

Figure 4:
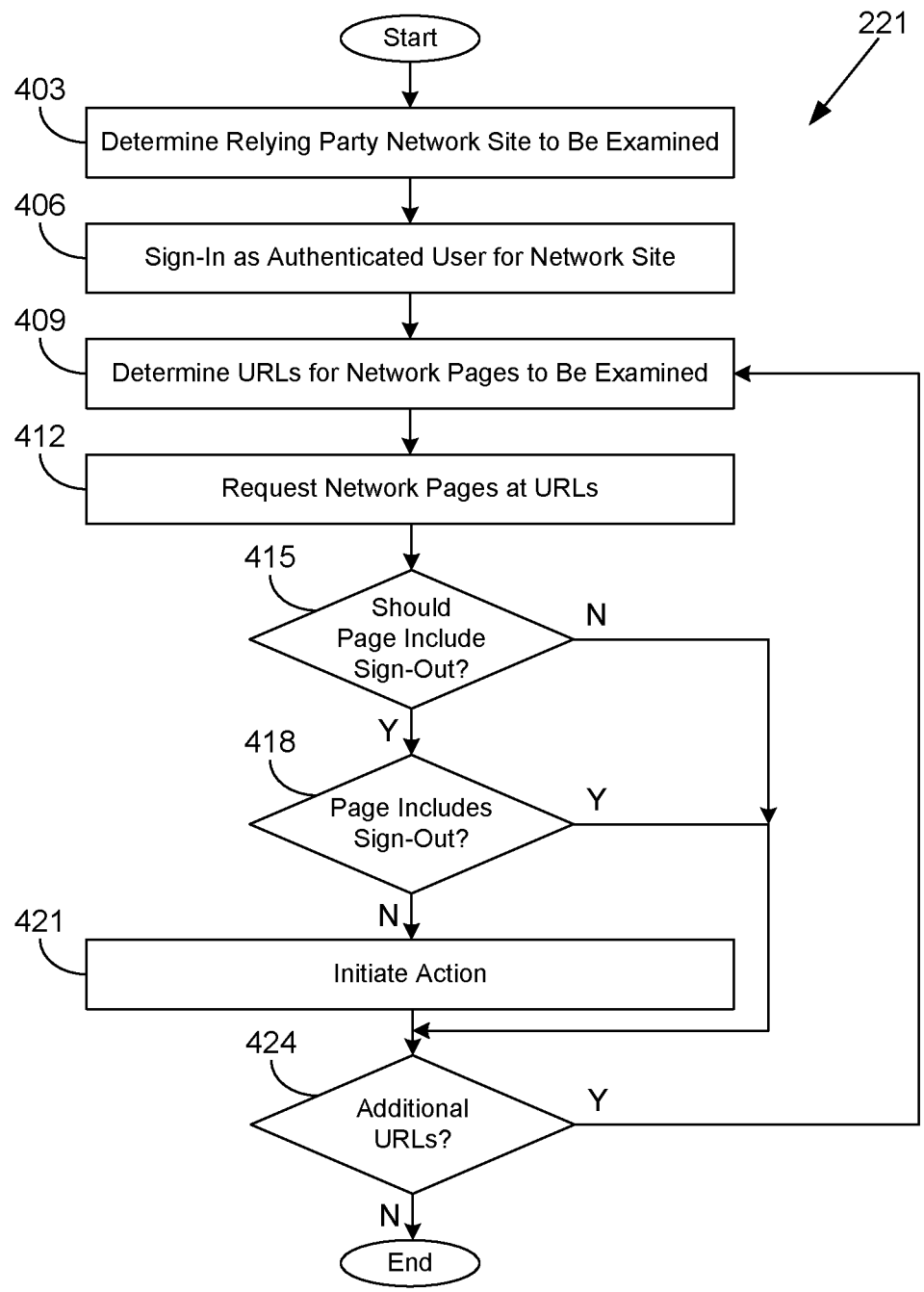
FIGS. 4 and 5 are flowcharts illustrating examples of functionality implemented as portions of a sign-out validation application executed in a computing environment in the networked environment of FIG. 2 according to various embodiments of the present disclosure.

Moving on to FIG. 4, shown is a flowchart that provides one example of the operation of a portion of the sign-out validation application 221 according to various embodiments. It is understood that the flowchart of FIG. 4 provides merely an example of the many different types of functional arrangements that may be employed to implement the operation of the portion of the sign-out validation application 221 as described herein. As an alternative, the flowchart of FIG. 4 may be viewed as depicting an example of elements of a method implemented in the computing environment 203 (FIG. 2) according to one or more embodiments.

Beginning with box 403, the sign-out validation application 221 determines a network site server 251 (FIG. 2) corresponding to a network site of a relying party to be examined. The relying party relies upon the federated identity provider service 218 for providing user identity verification. In box 406, the sign-out validation application 221 signs in to the network site server 251 as an authenticated user via the federated identity provider service 218. In order to test or observe whether sign-out functionality is properly implemented, it may be necessary to be signed in as an authenticated user. The corresponding credentials and an authentication endpoint may be specified in the crawler configuration data 239.

In box 409, the sign-out validation application 221 determines universal resource locators (URLs) for network pages 254 (FIG. 2) served by the network site server 251 that are to be examined. For example, the sign-out validation application 221 may request a homepage (e.g., "/" or the root directory) from the network site server 251 and identify all or some of the URLs linked within that homepage. The crawler configuration data 239 may specify rules for determining URLs on a site-specific or general basis. In one example, the sign-out validation application 221 may identify a URL to be crawled based at least in part on a referring URL observed by the federated identity provider service 218 when users sign-in for the relying party, or a completion URL to which users are directed upon a successful sign-in. In other cases, the URL to be crawled may be specified during a registration or on-boarding process for a relying party and then stored in the crawler configuration data 239.

In box 412, the sign-out validation application 221 requests the network pages 254 corresponding to the URLs from the network site server 251. For example, the sign-out validation application 221 may issue an HTTP "GET" request for each URL. For session tracking, the sign-out validation application 221 may specify a session token either in the URL or by presenting a cookie.

In box 415, the sign-out validation application 221 determines, for each particular network page 254, whether that network page 254 should include one or more components that implement sign-out functionality. Whether the network page 254 should include components that implement sign-out functionality may be configured via rules in the crawler configuration data 239. For example, the rules may specify that all top-level network pages 254 linked to the homepage of a network site should include sign-out functionality.

If it is determined that the network page 254 should include sign-out functionality, the sign-out validation application 221 continues to box 418 and assesses whether the network page 254 does in fact include code that properly implements the sign-out functionality. In this regard, the sign-out validation application 221 may scan the elements of the network page 254 to determine whether valid sign-out code 236 (FIG. 2) is present. In some cases, the sign-out validation application 221 may determine that the valid sign-out code 236 is present but is improperly configured, in which case the valid sign-out code 236 may be deemed not properly implemented in the network page 254.

Further, in some cases, the valid sign-out code 236 is present a sign-out button or link cannot be seen by the user (e.g., hidden by other user interface elements, transparent text, etc.). Thus, the sign-out validation application 221 may test for end user visibility of potential sign-out components (e.g., render the network page 254 to an image and search the image for corresponding text of "Sign Out") in order to deem the sign-out functionality properly implemented.

In one scenario, a network page 254 may have code to end a session with the network site server 251 but does not perform the sign-out with the federated identity provider service 218. In one embodiment, the sign-out validation application 221 may determine a potential sign-out component in a network page 254 (e.g., a button image or hyperlink labeled "Sign Out" that is associated with a URL), activate the component (e.g., access the URL), and then observe whether a sign-out occurs at the federated identity provider service 218, in order to assess whether sign-out functionality is properly implemented. For example, the network site server 251 may complete the sign out with the federated identity provider service 218. If the network site server 251 does complete the sign out, the network page 254 may be deemed to include code that properly implements the sign-out functionality.

If one or more network pages 254 that should contain code that properly implements sign-out functionality but do not, the sign-out validation application 221 proceeds to box 421 and initiates one or more actions. Such an action may include simply generating a report or notification for an administrative user indicating which network pages 254 lack the proper sign-out functionality. In some cases, the sign-out validation application 221 may cause any users who have not yet been signed out of the federated identity provider service 218 to be signed out. The sign-out validation application 221 may establish a shorter period of session expiration for relying parties that are associated with impaired sign-out functionality. In a more extreme case, such an action may include disabling sign-in access for users through the network site server 251 of the particular relying party. In some situations, these actions may be initiated when a network page 254 is not required to include properly implemented sign-out functionality but includes improperly implemented sign-out functionality, thereby allowing users to believe they are signed out when they are not. The sign-out validation application 221 proceeds to box 424.

If the network pages 254 are not required to include properly implemented sign-out functionality or if the network page 254 includes properly implemented sign-out functionality, the sign-out validation application 221 also continues to box 424. In box 424, the sign-out validation application 221 determines whether additional URLs are to be examined. For example, each of the requested network pages 254 from box 412 may link to additional network pages 254 of the network site. If additional URLs are to be examined, the sign-out validation application 221 returns to box 409 and determines the additional URLs. Otherwise, the portion of the sign-out validation application 221 ends.

Although the discussion of FIG. 4 pertains to network pages 254 served by a network site server 251, the principles can also apply to the analysis of a client application 260 (FIG. 2), such as a native application or a web-view application, that is configured for accessing resources of a relying party. Embodiments of the sign-out validation application 221 can perform a traversal of user interfaces 263 (FIG. 2) rendered by a client application 260. The sign-out validation application 221 can then activate potential sign-out components (e.g., a button labeled "sign out") to empirically examine whether sign-out from the federated identity provider service 218 is correctly implemented. In some embodiments, the sign-out validation application 221 can perform static and/or dynamic analysis of code for the client application 260 to determine whether API calls for valid sign-out code 236 are present. In one embodiment, the sign-out validation application 221 may examine source code documentation accompanying the client application 260 to determine if it contains a reference to the valid sign-out code 236.

Figure 5:
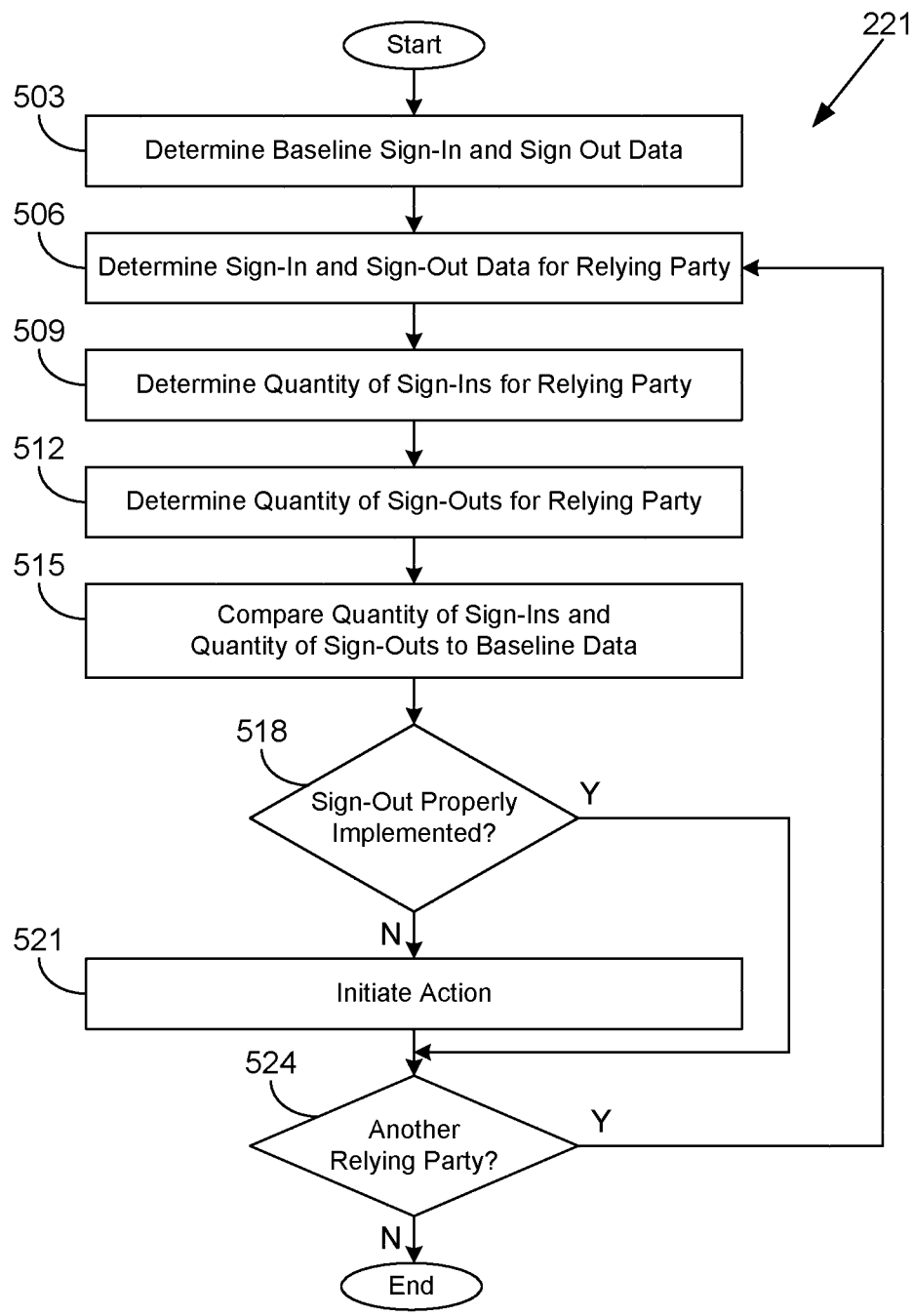

Continuing to FIG. 5, shown is a flowchart that provides one example of the operation of another portion of the sign-out validation application 221 according to various embodiments. It is understood that the flowchart of FIG. 5 provides merely an example of the many different types of functional arrangements that may be employed to implement the operation of the other portion of the sign-out validation application 221 as described herein. As an alternative, the flowchart of FIG. 5 may be viewed as depicting an example of elements of a method implemented in the computing environment 203 (FIG. 2) according to one or more embodiments.

Beginning with box 503, the sign-out validation application 221 determines the baseline data 233 (FIG. 2) corresponding to baseline thresholds or ratios for sign-out volume versus sign-in volume across multiple relying parties of a federated identity provider. Determining the baseline volume with respect to observed data may be significant in that sign-outs are not expected to equal sign-ins because users often choose not to explicitly sign-out. In some cases, the baseline data 233 may pertain to specific categories of relying parties. For example, users may be more likely to sign out of email services and less likely to sign out of news content services. The sign-in and sign-out volumes for each category may be averaged to yield the baseline data 233. Also, in some situations, the baseline volumes may be referenced with respect to determinations of whether sign-out functionality is properly implemented using the crawling approach described in FIG. 4. Thus, if a relying party who properly implements sign-out functionality is observed having sign-outs only thirty percent of the time, a baseline threshold at or below thirty percent may be employed.

In box 506, the sign-out validation application 221 determines sign-in data 230 (FIG. 2) and sign-out data 227 (FIG. 2) associated with a particular relying party to be examined. In box 509, the sign-out validation application 221 determines a quantity of sign-ins associated with a relying party during a time period. In one scenario, the sign-ins associated with a private browsing mode or "incognito" mode may be excluded from consideration, as the session tokens are deleted when the browsing window is closed, thereby making an explicit sign-out unnecessary. In box 512, the sign-out validation application 221 determines a quantity of sign-outs associated with the relying party during the time period.

In box 515, the sign-out validation application 221 compares the determined quantity of sign-ins and the determined quantity of sign-outs for the relying party with the baseline data 233. In one embodiment, the sign-out validation application 221 compares the quantity of sign-outs with a minimum baseline threshold. In another embodiment, the sign-out validation application 221 compares a ratio of the quantity of sign-outs to the quantity of sign-ins to a minimum baseline ratio.

In box 518, from this comparison, the sign-out validation application 221 determines whether the relying party has properly implemented the sign-out functionality. As an example, if the quantity of sign-outs is zero or below a minimum baseline threshold, it may be determined that sign-out functionality is not properly implemented. As another example, if the ratio of the quantity of sign-outs to the quantity of sign-ins is below a minimum baseline threshold, it may be determined that the sign-out functionality is not properly implemented. By using a ratio of the quantity of sign-outs to the quantity of sign-ins, the frequency of sign-outs is assessed, which normalizes the absolute numbers with respect to the volume of sign-ins. For example, a quantity of fewer than fifty sign-outs may be an absolute baseline threshold for determining that sign-out functionality is not properly implemented, but for a relying party with a heavy sign-in volume (e.g., 10,000 sign-outs during a time period), a larger quantity of sign-outs (e.g., five hundred) may be a baseline threshold for determining that sign-out functionality is not properly implemented.

The determination of whether the sign-out functionality is properly implemented may be regarded as an estimate with a certain confidence score, where the confidence score may be determined based at least in part on proximity to baseline threshold values. For example, users may simply choose not to sign-out of a particular network site for a relying party because they are not concerned about untrusted third parties gaining access.

If it is determined that the relying party has not properly implemented the sign-out functionality, the sign-out validation application 221 continues to box 521 and initiates one or more actions. Such an action may include simply generating a report or notification for an administrative user indicating which network pages 254 lack the proper sign-out functionality. In some cases, the sign-out validation application 221 may cause any users who have not yet been signed out of the federated identity provider service 218 to be signed out. The sign-out validation application 221 may establish a shorter period of session expiration for relying parties that are associated with impaired sign-out functionality. In a more extreme case, such an action may include configuring the federated identity provider service 218 to disallow sign-in access for users through the network site server 251 of the particular relying party. The sign-out validation application 221 proceeds to box 524. If the sign-out functionality is determined to be properly implemented, the sign-out validation application 221 also proceeds to box 524.

In box 524, the sign-out validation application 221 determines whether sign-ins and sign-outs for another relying party of the federated identity provider are to be examined. If so, the sign-out validation application 221 then returns to box 506 and determines the sign-in data 230 and sign-out data 227 associated with the next relying party to be examined. Otherwise, if sign-ins and sign-outs for another relying party are not to be examined, the operation of the portion of the sign-out validation application 221 ends.

The implementations of the sign-out validation application 221 described with reference to FIGS. 4 and 5 may be executed at periodic intervals. For example, a relying party that previously included valid sign-out code 236 (FIG. 2) that was correctly configured in its network pages 254 may update its network pages 254 such that the sign-out implementation becomes broken or non-functional. Similarly, after an action is initiated (e.g., at box 521 of FIG. 5 or box 421 of FIG. 4), the relying party may take steps to properly implement the sign-out functionality. For these reasons, it may be helpful to execute the sign-out validation application 221 at a periodic interval to account for such changes.

In one embodiment, examination of sign-out functionality of a relying party may be automatically prompted in response to a determination that a specific event has occurred. For example, sessions initiated through the relying party may be associated with a level of fraud meeting a predefined threshold. The fraud may have resulted from users who think they have signed out but actually have not due to improperly implemented sign-out functionality. Consequently, subsequent malicious users may have access to secured resources to commit fraud.

Moreover, although portions of the sign-out validation application 221 are described with reference to both FIGS. 4 and 5, it is understood that a mixture of both approaches may be used in some cases. For example, the sign-out validation application 221 can be configured both to crawl network pages 254 of a relying party and to examine sign-in and sign-out volumes. In some cases, crawling network pages 254 may fail (e.g., if the sign-out validation application 221 cannot sign-in as an authenticated user or pass a completely automated public Turing test to tell computers and humans apart (CAPTCHA) test), and examining sign-in and sign-out volumes may be a fallback approach. Conversely, in some cases, examining sign-in and sign-out volumes may itself be non-determinative (e.g., when users are not concerned about privacy at a given network site and never sign-out), and crawling the network pages 254 may be a fallback approach.

Figure 6:
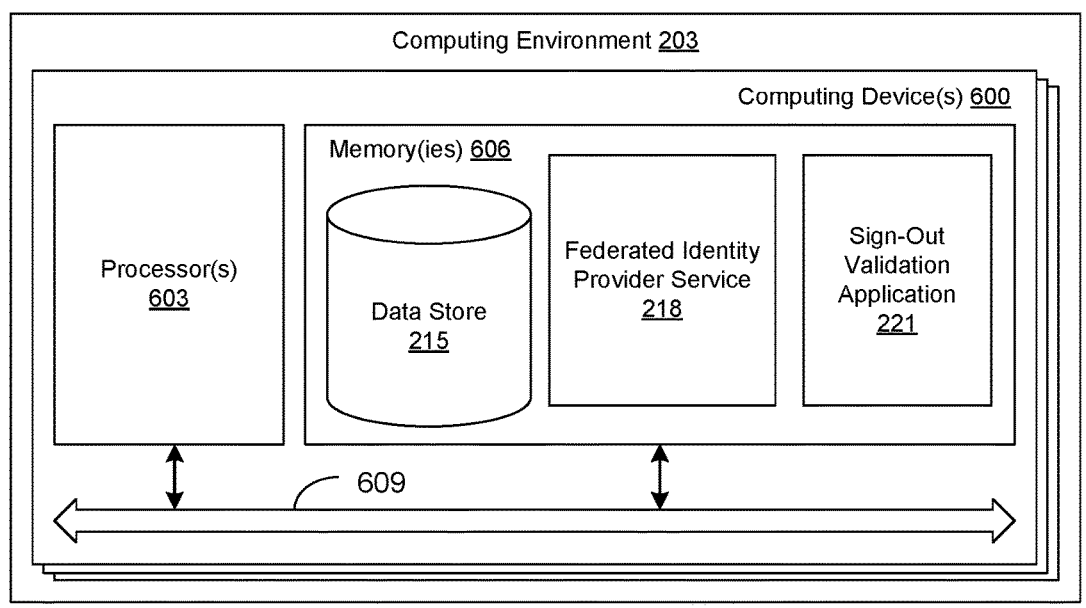
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the federated identity provider service 218, the sign-out validation application 221, and potentially other applications. Also stored in the memory 606 may be a data store 215 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the federated identity provider service 218, the sign-out validation application 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-5 show the functionality and operation of an implementation of portions of the federated identity provider service 218 and the sign-out validation application 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the federated identity provider service 218 and the sign-out validation application 221, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the federated identity provider service 218 and the sign-out validation application 221, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   crawling, via at least one of one or more computing devices, a network site operated by a relying party of a federated identity provider to identify a uniform resource locator (URL) of a network page;
   receiving, via at least one of the one or more computing devices, the network page at the URL;
   analyzing, via at least one of the one or more computing devices, the network page to determine whether the network page includes code that properly implements a sign-out from the federated identity provider;
   recording, via at least one of the one or more computing devices, sign-in data and sign-out data for the relying party at a service of the federated identity provider;
   determining, via at least one of the one or more computing devices, from the sign-in data and the sign-out data, a quantity of sign-ins and a quantity of sign-outs associated with the relying party;
   determining, via at least one of the one or more computing devices, that the relying party has not properly implemented sign-out functionality for the federated identity provider based at least in part on at least one of:
     the quantity of sign-outs and the quantity of sign-ins associated with the relying party; or
     a determination that the network page does not include code that properly implements the sign-out from the federated identity provider; and
   initiating, via at least one of the one or more computing devices, an action in response to determining that the relying party has not properly implemented the sign-out functionality, wherein the action comprises at least one of:

configuring a service of the federated identity provider to disallow sign-ins from the network site;

configuring the service of the federated identity provider to assign a shorter period of session expiration to a session originating from the network site;

causing a plurality of users who signed in via the network site to be automatically signed out by the service of the federated identity provider; or generating a report indicating that the relying party has not properly implemented the sign-out functionality.

2. The method of claim 1, further comprising signing in, via at least one of the one or more computing devices, under a user identity via the network site with a service of the federated identity provider before crawling the network site.

3. A system, comprising:

at least one computing device; and at least one application executable in the at least one computing device, wherein when executed the at least one application causes the at least one computing device to at least:

crawl a network site operated by a relying party of a federated identity provider to identify a uniform resource locator (URL) of a network page;

receive the network page at the URL;

analyze the network page to determine whether the network page includes code that properly implements a sign-out from the federated identity provider;

record sign-in data and sign-out data for the relying party at a service of the federated identity provider;

determine from the sign-in data and the sign-out data, a quantity of sign-ins and a quantity of sign-outs associated with the relying party;

determine that the relying party has not properly implemented sign-out functionality for the federated identity provider based at least in part on at least one of:

the quantity of sign-outs and the quantity of sign-ins associated with the relying party; or a determination that the network page does not include code that properly implements the sign-out from the federated identity provider; and initiate an action in response to determining that the relying party has not properly implemented the sign-out functionality, wherein the action comprises at least one of:

configuring a service of the federated identity provider to disallow sign-ins from the network site;

configuring the service of the federated identity provider to assign a shorter period of session expiration to a session originating from the network site;

causing a plurality of users who signed in via the network site to be automatically signed out by the service of the federated identity provider; or generating a report indicating that the relying party has not properly implemented the sign-out functionality.

4. The system of claim 3, wherein when executed the at least one application is configured to cause the at least one computing device to at least determine the URL of the network page based at least in part on a referring uniform resource locator received by the federated identity provider during a sign-in.

5. The system of claim 3, wherein when executed the at least one application is configured to cause the at least one computing device to at least periodically assess whether the network page properly implements the sign-out from the federated identity provider.

6. The system of claim 3, wherein determining whether the network page includes the code that properly implements the sign-out from the federated identity provider further comprises determining whether the network page includes approved predefined code that properly implements the sign-out from the federated identity provider.

7. The system of claim 3, wherein determining whether the network page includes the code that properly implements the sign-out from the federated identity provider further comprises:

determining a potential sign-out component in the network page;

activating the potential sign-out component; and determining whether a service of the federated identity provider has received a sign-out in response to activating the potential sign-out component.

8. The system of claim 3, wherein the action comprises configuring the service of the federated identity provider to disallow sign-ins originating from the network site.

9. The system of claim 3, wherein the action comprises generating the report indicating that the network site has not properly implemented sign-out functionality.

10. The system of claim 3, wherein when executed the at least one application further causes the at least one computing device to at least sign-in with a user identity through the network site via the federated identity provider before receiving the network page.

11. The system of claim 3, wherein when executed the at least one application further causes the at least one computing device to at least analyze sign-in data and sign-out data for individual ones of a plurality of relying parties to determine a baseline ratio of sign-outs to sign-ins associated with a proper implementation of the sign-out functionality.

12. The system of claim 3, wherein when executed the at least one application further causes the at least one computing device to at least analyze sign-out data for individual ones of a plurality of relying parties to determine a baseline sign-out quantity threshold associated with a proper implementation of the sign-out functionality.

13. A method, comprising:

crawling, via at least one of one or more computing devices, a network site operated by a particular relying party of a plurality of relying parties of a federated identity provider to identify a uniform resource locator (URL) of a network page;

receiving, via at least one of the one or more computing devices, the network page at the URL;

analyzing, via at least one of the one or more computing devices, the network page to determine whether the network page includes code that properly implements a sign-out from the federated identity provider;

recording, via at least one of the one or more computing devices, sign-out data for individual ones of the plurality of relying parties of the federated identity provider;

analyzing, via at least one of the one or more computing devices, sign-in data and the sign-out data for the individual ones of the plurality of relying parties to determine a baseline ratio of sign-outs to sign-ins associated with a proper implementation of sign-out functionality for the federated identity provider or a baseline sign-out quantity threshold associated with the proper implementation of the sign-out functionality;

determining, via at least one of the one or more computing devices, from the sign-out data, a quantity of sign-outs associated with the particular relying party;

determining, via at least one of the one or more computing devices, that the particular relying party has not properly implemented the sign-out functionality for the federated identity provider based at least in part on at least one of:

the quantity of sign-outs associated with the particular relying party; or a determination that the network page does not include code that properly implements the sign-out from the federated identity provider; and initiating, via at least one of the one or more computing devices, an action in response to determining that the particular relying party has not properly implemented the sign-out functionality, wherein the action comprises at least one of:

configuring a service of the federated identity provider to disallow sign-ins from the network site;

configuring the service of the federated identity provider to assign a shorter period of session expiration to a session originating from the network site;

causing a plurality of users who signed in via the network site to be automatically signed out by the service of the federated identity provider; or generating a report indicating that the relying party has not properly implemented the sign-out functionality.

14. The method of claim 13, wherein the action comprises configuring a service of the federated identity provider to assign a shorter period of session expiration to a session originating from the particular relying party.

15. The method of claim 13, wherein the action comprises causing a plurality of users who signed in via the relying party to be automatically signed out by a service of the federated identity provider.

16. The method of claim 13, wherein determining that the particular relying party has not properly implemented the sign-out functionality further comprises determining, via at least one of the one or more computing devices, that the quantity of sign-outs is below a predefined threshold.

17. The method of claim 13, wherein determining that the particular relying party has not properly implemented the sign-out functionality further comprises determining, via at least one of the one or more computing devices, that a ratio of the quantity of sign-outs to a quantity of sign-ins is below a predefined threshold.

18. The method of claim 13, wherein the sign-out data is recorded by a service of the federated identity provider.

19. The method of claim 13, wherein the action comprises configuring a service of the federated identity provider to disallow sign-ins from the network site.

20. The method of claim 13, wherein the action comprises generating a report indicating that the particular relying party has not properly implemented the sign-out functionality.

* * * * *